United States Patent
Wu

(10) Patent No.: US 12,309,834 B2
(45) Date of Patent: May 20, 2025

(54) LISTEN-BEFORE-TALK FAILURE PROCESSING METHOD, TERMINAL, AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 371 days.

(21) Appl. No.: 17/723,430

(22) Filed: Apr. 18, 2022

(65) Prior Publication Data

US 2022/0248463 A1    Aug. 4, 2022

Related U.S. Application Data

(63) Continuation of application No. PCT/CN2020/126660, filed on Nov. 5, 2020.

(30) Foreign Application Priority Data

Nov. 6, 2019   (CN) ......................... 201911077988.0

(51) Int. Cl.
    *H04W 74/0808*     (2024.01)
    *H04W 74/0833*     (2024.01)

(52) U.S. Cl.
    CPC ... *H04W 74/0808* (2013.01); *H04W 74/0833* (2013.01)

(58) Field of Classification Search
    None
    See application file for complete search history.

(56) References Cited

U.S. PATENT DOCUMENTS

| 2017/0332358 | A1 | 11/2017 | Park et al. | |
| 2021/0007146 | A1* | 1/2021 | Agiwal | H04W 74/0833 |
| 2021/0100031 | A1* | 4/2021 | Cirik | H04W 76/18 |
| 2021/0105096 | A1* | 4/2021 | Chin | H04L 1/1812 |
| 2022/0217722 | A1* | 7/2022 | Wang | H04W 72/542 |
| 2022/0295561 | A1* | 9/2022 | Wang | H04W 74/0866 |
| 2022/0346174 | A1* | 10/2022 | Wang | H04W 74/0808 |

(Continued)

FOREIGN PATENT DOCUMENTS

| CN | 106559882 A | 4/2017 |
| CN | 107371168 A | 11/2017 |

(Continued)

OTHER PUBLICATIONS

International Search Report issued in corresponding International Application No. PCT/CN2020/126660, mailed Feb. 5, 2021, 6 pages.

(Continued)

*Primary Examiner* — Otis L Thompson, Jr.
(74) *Attorney, Agent, or Firm* — IPX PLLC

(57) ABSTRACT

The present disclosure provides a listen-before-talk (LBT) failure processing method, a terminal, and a network side device. The LBT failure processing method can be performed by the terminal. The method includes sending LBT failure information by using a medium access control (MAC) control element (CE) in a case of an LBT failure. The present disclosure limits a manner of reporting LBT failure information.

20 Claims, 4 Drawing Sheets

(56) References Cited

U.S. PATENT DOCUMENTS

2022/0400396 A1* 12/2022 Alfarhan .......... H04W 74/0808

FOREIGN PATENT DOCUMENTS

| CN | 107770868 A | 3/2018 |
|----|-------------|--------|
| WO | 2019195465 A1 | 10/2019 |

OTHER PUBLICATIONS

Interdigital, "Handling UL LBT Failures in MAC", 3GPP RAN WG2 Meeting #107bis R2-1912889, Oct. 18, 2019.
Huawei et al, "UL LBT failure", 3GPP TSG-RAN WG2 Meeting 107bis R2-1913029, Oct. 18, 2019.
First Office Action issued in related Chinese Application No. 201911077988.0, mailed Aug. 24, 2022, 7 pages.
Vivo, "Remaining Issues on Uplink LBT Failure", 3GPP TSG-RAN WG2 Meeting #107bis R2-1912177, Oct. 2019, 4 pages.

\* cited by examiner

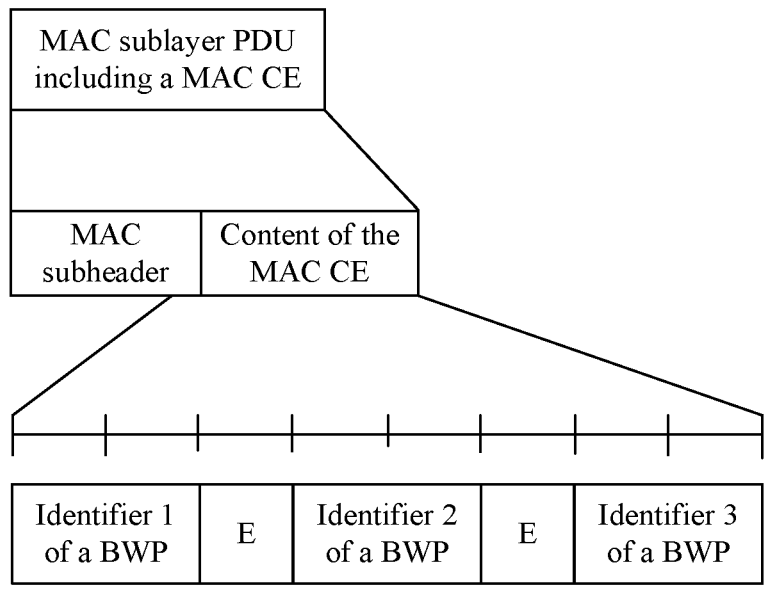
FIG. 5
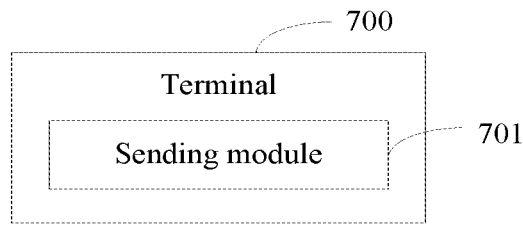
FIG. 6
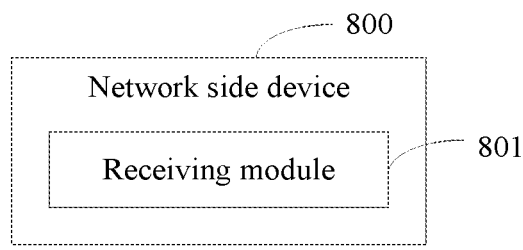
FIG. 7
FIG. 8

LISTEN-BEFORE-TALK FAILURE PROCESSING METHOD, TERMINAL, AND NETWORK SIDE DEVICE

CROSS-REFERENCE TO RELATED APPLICATIONS

This application is a continuation of International Application No. PCT/CN2020/126660, filed on Nov. 5, 2020, which claims priority to Chinese Patent Application No. 201911077988.0, filed on Nov. 6, 2019, both of which are incorporated herein by reference in their entireties.

TECHNICAL FIELD

Embodiments of the present disclosure relate to the field of communications technologies, and in particular, to a Listen-Before-Talk (LBT) failure processing method, a terminal, and a network side device.

BACKGROUND

In a 5th Generation (5G) mobile communications system, if a terminal wants to send a signal on an unlicensed band, the terminal needs to listen to, before sending the signal, whether the unlicensed band is occupied (or idle). If the unlicensed band is not occupied (or is idle), the terminal can send the signal on the unlicensed band; or if the band is occupied, the terminal cannot send the signal on the unlicensed band, in other words, LBT fails.

The terminal may notify a network side device of an LBT failure event in a case of the LBT failure. However, currently, there is no related solution to how the terminal notifies the network side device of the LBT failure event.

SUMMARY

Embodiments of the present disclosure provide an LBT failure processing method, a terminal, and a network side device, to report LBT failure information in a case of an LBT failure, and solve a problem that a success rate of uplink sending by a terminal is relatively low due to the LBT failure.

To solve the foregoing technical problem, the present disclosure is implemented as follows:

LBT failure information is sent by using a Medium Access Control (MAC) Control Element (CE) in a case of an LBT failure.

According to a second aspect, an embodiment of the present disclosure provides an LBT failure processing method, applied to a network side device. The method includes:

receiving LBT failure information that is sent by using a MAC CE.

According to a third aspect, an embodiment of the present disclosure further provides a terminal, including:

a sending module, configured to send LBT failure information by using a MAC CE in a case of an LBT failure.

According to a fourth aspect, an embodiment of the present disclosure further provides a network side device, including:

a receiving module, configured to receive LBT failure information that is sent by using a MAC CE.

According to a fifth aspect, an embodiment of the present disclosure further provides a terminal. The terminal includes a processor, a memory, and a computer program that is stored in the memory and that can be run on the processor, and when the computer program is executed by the processor, steps of the foregoing LBT failure processing method applied to the terminal are implemented.

According to a sixth aspect, an embodiment of the present disclosure further provides a network side device. The network side device includes a processor, a memory, and a computer program that is stored in the memory and that can be run on the processor, and when the computer program is executed by the processor, steps of the foregoing LBT failure processing method applied to the network side device are implemented.

According to a seventh aspect, an embodiment of the present disclosure further provides a computer-readable storage medium. The computer-readable storage medium stores a computer program, where when the computer program is executed by a processor, steps of the foregoing LBT failure processing method applied to the terminal or steps of the foregoing LBT failure processing method applied to the network side device are implemented.

In the embodiments of the present disclosure, the terminal may report the LBT failure information by using the MAC CE in the case of the LBT failure. Further, after receiving the LBT failure information, the network side device may instruct the terminal to change an operating frequency, to perform LBT on the changed operating frequency, thereby increasing a success rate of uplink sending by the terminal.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 3 is a first schematic structural diagram of a MAC CE according to an embodiment of the present disclosure;

FIG. 5 is a third schematic structural diagram of a MAC CE according to an embodiment of the present disclosure;

FIG. 6 is a second flowchart of an LBT failure processing method according to an embodiment of the present disclosure;

FIG. 7 is a first structural diagram of a terminal according to an embodiment of the present disclosure;

FIG. 8 is a first structural diagram of a network side device according to an embodiment of the present disclosure;

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms such as "first" and "second" in this application are used to distinguish between similar objects, and are unnecessarily used to describe a specific order or sequence. In addition, terms "include", "have", and any variants thereof are intended to cover non-exclusive inclusion, for example, processes, methods, systems, products, or devices that contain a series of steps or units are unnecessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Figure 1:
FIG. 1 is a structural diagram of a network system to which embodiments of the present disclosure can be applied.

FIG. 1 is a structural diagram of a network system to which the embodiments of the present disclosure can be applied. As shown in FIG. 1, the network system includes a terminal 11 and a network side device 12. The terminal 11 and the network side device 12 may communicate with each other.

In this embodiment of the present disclosure, the terminal 11 may be alternatively referred to as a User Equipment (UE). During actual application, the terminal 11 may be a mobile phone, a tablet personal computer, a laptop computer, a Personal Digital Assistant (PDA), a Mobile Internet Device (MID), a wearable device, a vehicle-mounted device, or the like. The network side device 12 may be a base station, a relay, an access point, or the like.

For ease of understanding, the following describes some content in the embodiments of the present disclosure:

1. New Radio-Unlicensed (NR-U):

In a 5G mobile communications system, if the UE wants to send a signal on an unlicensed band, the UE needs to listen to, before sending the signal, whether the unlicensed band is occupied (or idle). If the unlicensed band is not occupied (or is idle), the terminal can send the signal on the unlicensed band. Alternatively, if the band is occupied, the UE cannot send the signal on the band, in other words, LBT fails.

If the UE needs to receive and send data on the unlicensed band, the UE needs to meet a rule of using the unlicensed band. The UE needs to perform LBT in a particular frequency range (for example, a frequency sub-band) based on the rule of using the unlicensed band, and the UE can send the signal on the unlicensed band only when learning, through listening in the particular frequency range, that the unlicensed band is not occupied. In the 5G mobile communications system, a plurality of frequency sub-bands may be configured for one particular BandWidth Part (BWP) or cell.

The UE may detect an uplink sending failure caused by LBT, and the network side device may configure a corresponding timer and/or counter for detecting "an uplink congestion failure". For example, if a quantity of times (namely, the counter) of uplink sending failures in a particular time (namely, the timer) reaches or exceeds a threshold configured by the network side device, the UE may determine that "an uplink congestion failure" happens.

If it is detected that an uplink LBT failure occurs on the UE on a BWP of a cell, the UE changes its activated BWP to another BWP of the cell, triggers a random access process, and reports failure information to the network side. If the uplink LBT failure occurs on the UE on a plurality of BWPs continuously, the UE may change the BWP for a plurality of times based on configuration of the network side device. The UE changes the BWP, to change an operating frequency of the UE in the NR-U, to find a BWP on which no congestion happens on the frequency.

2. BWP

In the 5G mobile communications system, the terminal may support only one relatively low operating bandwidth, for example, a 5 MHz bandwidth, and a cell of the network side device may support a relatively high bandwidth, for example, a 100 MHz bandwidth, and a small bandwidth part used for the terminal to work in the relatively high bandwidth is considered as a BWP. From the perspective of configuration of the terminal, for different terminal functions, the BWP may be considered as a BWP in one cell.

3. Multiplexing Priority

When receiving an uplink grant, the UE may multiplex data corresponding to different logical channel identifiers based on a data amount that may be carried on the uplink grant, to generate a MAC Protocol Data Unit (PDU) and send the MAC PDU.

In a process of generating the MAC PDU, the data is sorted below in a descending order of the multiplexing priorities:

- a Cell Radio Network Temporary Identifier (C-RNTI) MAC CE or data from an UpLink Common Control CHannel (UL-CCCH);
- a configured grant confirmation MAC CE;
- a MAC CE used for a first Buffer Status Report (BSR), where the first BSR is a BSR other than a BSR included for padding;
- a single entry Power Headroom Report (PHR) MAC CE or a multiple entry PHR MAC CE;
- data from a first logical channel, where the first logical channel is a logical channel other than the UL-CCCH;
- a MAC CE used for recommended bit rate query; and
- a MAC CE used for a BSR included for padding.

The following describes the LBT failure processing method in the embodiments of the present disclosure.

Figure 2:
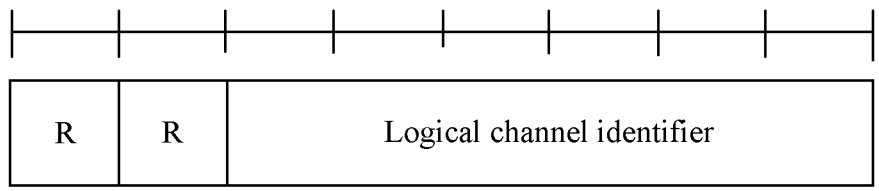
FIG. 2 is a first flowchart of an LBT failure processing method according to an embodiment of the present disclosure.

FIG. 2 is a first flowchart of an LBT failure processing method according to an embodiment of the present disclosure. The LBT failure processing method in this embodiment may be applied to a terminal.

As shown in FIG. 2, the LBT failure processing method may include the following steps.

Step 201. Send LBT failure information by using a MAC CE in a case of an LBT failure.

In this embodiment, the LBT failure information may be used to indicate that the LBT failure occurs on the terminal at least once. Further, the LBT failure information is carried in the MAC CE.

During specific implementation, each time the LBT failure occurs on the terminal, the terminal may send the LBT failure information by using the MAC CE. Specifically, in the case of the LBT failure, the terminal may initiate a random access process, and send, to a network side device in the random access process, the MAC CE carrying the LBT failure information. In this way, after receiving the LBT failure information, the network side device may learn that the LBT failure occurs on the terminal on the activated BWP, to instruct the terminal to change an operating frequency. After changing the operating frequency, the terminal may perform LBT on the changed operating frequency again. In a case of successful LBT, the terminal may perform uplink sending on an unlicensed band, to increase an uplink sending success rate.

The terminal may change the operating frequency by changing the activated BWP, or by changing a cell. This is specifically determined based on an actual status, and this is not limited in this embodiment of the present disclosure.

In addition, if the random access process initiated by the terminal is a four-step random access process, the MAC CE may be carried in a Message (Msg) 3; or if the random access process initiated by the terminal is a two-step random access process, the MAC CE may be carried in a MsgA.

In this embodiment, the terminal may report the LBT failure information by using the MAC CE in the case of the LBT failure. Further, after receiving the LBT failure information, the network side device may instruct the terminal to change an operating frequency, to perform LBT on the changed operating frequency, thereby increasing a success rate of uplink sending by the terminal.

In this embodiment, the LBT failure information may include either one of the following:
- a logical channel identifier, where the logical channel identifier is used to indicate that the LBT failure occurs on the terminal on a BWP; and
- identifiers of N BWPs, where the LBT failure occurs on the terminal on M BWPs, the M BWPs include the N BWPs, N is a positive integer, and M is a positive integer greater than or equal to N.

For ease of understanding, specific descriptions are as follows:

In scenario 1, the LBT failure information includes the Logical Channel IDentifier (LCID).

For scenario 1, the LBT failure information may be used to indicate that the LBT failure occurs on the terminal on the activated BWP. In this way, after obtaining the logical channel identifier, the network side device can learn that the LBT failure occurs on the terminal on the activated BWP, to instruct the terminal to change the operating frequency.

It should be noted that the logical channel identifier used to indicate that the LBT failure occurs on the terminal on the BWP may be predetermined by using a protocol, or configured by the network side. However, this is not limited thereto. During actual application, the logical channel identifier may be represented as a logical channel number.

In scenario 2, the LBT failure information includes the identifier of the N BWPs.

For the scenario 2, the LBT failure information may be used to indicate that the LBT failure occurs on the terminal at least on the N BWPs.

In scenario 2, the LBT failure occurs on the terminal on the M BWPs. In other words, when the LBT failure occurs on the terminal for M times, the terminal may report the identifiers of the N BWPs in the M BWPS on which LBT fails. N may be less than or equal to M. It can be learned that during specific implementation, the terminal may send identifiers of some BWPs in the BWPs on which LBT fails, or may send identifiers of all BWPs on which LBT fails.

For scenario 2, when N is 1, the N BWPs may be either one of the following:
- a first BWP, where a time at which the LBT failure occurs on the terminal on the first BWP is earlier than a time at which the LBT failure occurs on the terminal on the other BWP in the M BWPs; and a second BWP, where a time at which the LBT failure occurs on the terminal on the second BWP is later than a time at which the LBT failure occurs on the terminal on the other BWP in the M BWPs.

That the LBT failure occurs on the terminal on the M BWPs means that the LBT failure occurs on the terminal for M times.

When the N BWPs are the first BWP, during specific implementation, the terminal may choose to report an identifier of a BWP on which LBT fails for the first time in the M times of LBT, namely, the identifier of the first BWP.

When the N BWPs are the second BWP, during specific implementation, the terminal may choose to report an identifier of a BWP on which LBT fails for the last time in the M times of LBT, namely, the identifier of the second BWP.

For ease of understanding, example descriptions are as follows:

The LBT failure occurs on the terminal on BWP-1, and then changes the BWP-1 to BWP-2. When the terminal initiates a random access process on the BWP-2, if the LBT failure still occurs on the terminal on the BWP-2, the terminal changes the BWP-2 to BWP-3. When the UE reports LBT failure information on the BWP-3, the BWP-1 is the first BWP, and the BWP-2 is the second BWP.

When N is greater than 1, the N BWPs may be any N BWPs in the M BWPs. In some embodiments, a sequence of arranging the identifiers of the N BWPs is determined based on a chronological sequence of failing, by the terminal, to perform LBT on the N BWPs.

In other words, a sequence of arranging the identifiers of the N BWPs in the LBT failure information is determined based on a chronological sequence of failing, by the terminal, to perform LBT on the N BWPs.

For example, in a first implementation, an identifier of a BWP on which LBT fails for the first time may be arranged in the first place, and correspondingly, an identifier of a BWP on which LBT fails for the last time may be arranged in the last place. In a second implementation, an identifier of a BWP on which LBT fails for the last time may be arranged in the first place, and correspondingly, an identifier of a BWP on which LBT fails for the first time may be arranged in the last place.

For ease of understanding, example descriptions are as follows:

It is assumed that the LBT failure occurs on the terminal on the BWP-1, the BWP-2, the BWP-3, and BWP-4 sequentially. Then, after failing to perform LBT on the BWP-4, the terminal may send the LBT failure information. During actual application, for example, the terminal may add identifiers of the BWP-1, the BWP-2, and the BWP-3 to the LBT failure information.

In this optional manner, for the first implementation, a sequence of arranging the identifiers of the BWP-1, the BWP-2, and the BWP-3 in the LBT failure information may be: the identifier of the BWP-1, the identifier of the BWP-2, and the identifier of the BWP-3.

For the second implementation, a sequence of arranging the identifiers of the BWP-1, the BWP-2, and the BWP-3 in the LBT failure information may be: the identifier of the BWP-3, the identifier of the BWP-2, and the identifier of the BWP-1.

In this embodiment, a format of the MAC CE is related to content of the LBT failure information. Descriptions are as follows:

For scenario 1, in other words, the LBT failure information includes the logical channel identifier, in some embodiments, the MAC CE includes a MAC sub-header. The LBT failure information is carried in the MAC sub-header.

During specific implementation, the MAC CE used to carry the LBT failure information may include only the MAC sub-header, and may not carry extra content of the MAC CE or content of a MAC Service Data Unit (SDU), to reduce signaling.

For scenario 2, in other words, the LBT failure information includes the identifiers of the N BWPs, in some embodiments, the MAC CE includes a MAC sub-header and content of the MAC CE. The identifiers of the N BWPs are carried in the content of the MAC CE.

When the MAC CE includes the MAC sub-header and the content of the MAC CE, further, the content of the MAC CE may further include an indication field, and the indication field is used to indicate whether a first bit carries an identifier of a BWP, where the first bit is a bit following a second bit in the content of the MAC CE, and the second bit is a bit occupied by the indication field.

In this way, when reading the content of the MAC CE, the network side device may determine, by using the indication field, whether to continue to read a remaining part of the content of the MAC CE. Specifically, if the indication field indicates that the first bit carries the identifier of the BWP, the network side device may continue to read the remaining part of the content of the MAC CE, or otherwise, may give up reading the remaining part of the content of the MAC CE, to reduce a running load of the network side device.

During actual application, for example, the indication field may be an E field. When a value of the E field is "0", it indicates that the first bit carries the identifier of the BWP; or when a value is "1", the first bit does not carry the identifier of the BWP.

In addition, when the indication field indicates that the first bit carries the identifier of the BWP, a remaining bit in the content of the MAC CE may be reserved, and may be referred to as a reserved bit.

It should be noted that during actual application, the second bit and the first bit may be continuous, or may be discontinuous. The second bit and the first bit may belong to a same octet, or may belong to different octets.

In addition, for an octet, a leftmost bit of the octet may be referred to as the first bit of the octet, a rightmost bit of the octet may be referred to as the last bit of the octet, and the rightmost bit of the octet is located after the leftmost bit of the octet. For a plurality of octets that are arranged vertically, an uppermost octet may be referred to as the first octet, a lowermost octet may be referred to as the last octet, and bits of the lowermost octet are located after bits of the uppermost octet.

It can be learned that the indication field is set in the MAC CE, so that the network side device can determine that a bit following the indication field in the content of the MAC CE includes an identifier of a BWP. When the indication field indicates that there is no identifier of a BWP subsequently, the network side device may stop detecting the identifier of the BWP in time, to reduce a running resource of the network side device.

It can be learned from the foregoing content that in this embodiment, the MAC CE used to carry the LBT failure information may be one of the following:
 a MAC CE in a first format, including only a MAC sub-header; and
 a MAC CE in a second format, including a MAC sub-header and content of the MAC CE.

It should be noted that during actual application, the terminal may add the LBT failure information by using the MAC CE in any format. This may be specifically determined based on an actual requirement, and this is not limited in this embodiment of the present disclosure.

In this embodiment, when reporting the MAC CE carrying the LBT failure information, the terminal may multiplex the MAC CE in a MAC PDU, and perform reporting by using the MAC PDU.

In some embodiments, when the MAC PDU is generated, a multiplexing priority of the LBT failure information meets any one of the following:
 the multiplexing priority of the LBT failure information is at least higher than a multiplexing priority of data from a first logical channel;
 the multiplexing priority of the LBT failure information is the same as a multiplexing priority of a C-RNTI MAC CE;
 the multiplexing priority of the LBT failure information is lower than only the multiplexing priority of the C-RNTI MAC CE; and
 the multiplexing priority of the LBT failure information is higher than only the multiplexing priority of the data from the first logical channel, where
 the first logical channel is a logical channel other than an uplink common control channel.

When the MAC PDU is generated, for a multiplexing priority of other data, refer to the foregoing description. Details are not described herein.

During specific implementation, when the multiplexing priority of the LBT failure information is lower than only the multiplexing priority of the C-RNTI MAC CE, the multiplexing priority of the LBT failure information is lower than the multiplexing priority of the C-RNTI MAC CE, but the multiplexing priority of the LBT failure information may be higher than a multiplexing priority of a "configured grant confirmation MAC CE", or the same as the multiplexing priority of the "configured grant confirmation MAC CE".

When the multiplexing priority of the LBT failure information is higher than only the multiplexing priority of the data from the first logical channel, the multiplexing priority of the LBT failure information is higher than the multiplexing priority of the data from the first logical channel, but the multiplexing priority of the LBT failure information may be lower than a multiplexing priority of a "PHR MAC CE", or same as a multiplexing priority of a "PHR MAC CE".

It can be learned that in this embodiment, the multiplexing priority of the LBT failure information is higher than at least the multiplexing priority of the data from the logical channel other than the UL-CCCH, to perform transmission by using a MAC CE with a higher priority, and reduce a transmission delay of the MAC CE.

It should be noted that the plurality of optional implementations described in this embodiment of the present disclosure may be implemented in combination with each other or may be implemented separately. This is not limited in this embodiment of the present disclosure.

For ease of understanding, example descriptions are as follows:

Embodiment 1

The LBT failure occurs on the terminal on BWP-1 of a cell, and the terminal changes the activated BWP-1 to BWP-2, and initiates a random access process. The terminal reports LBT failure information to the network side device. Content of the LBT failure information includes a logical channel identifier (for example, a logical channel number 49).

As shown in FIG. 3, the MAC CE may include only a MAC sub-header, and an LCD is carried in the MAC sub-header. The MAC CE may not carry extra content of a MAC CE or content of a MAC SDU, to reduce signaling.

After receiving the logical channel identifier, the network side device may learn that the LBT failure occurs on the terminal on the activated BWP, to instruct the terminal to change the activated BWP or the cell, to change an operating frequency of the terminal, so that the terminal can perform LBT on the changed operating frequency, thereby increasing a success rate of uplink sending by the terminal.

In addition, a multiplexing priority of the LBT failure information is at least higher than the multiplexing priority of the data from the logical channel other than the UL-CCCH.

Furthermore, the multiplexing priority of the LBT failure information may be any one of the following:
  same as the multiplexing priority of the C-RNTI MAC CE;
  lower than only the multiplexing priority of the C-RNTI MAC CE; and
  higher than only the multiplexing priority of the data from the logical channel other than the UL-CCCH.

Embodiment 2

The LBT failure occurs on the terminal on BWP-1 of a cell, and the terminal changes the activated BWP-1 to BWP-2, and initiates a random access process. The terminal reports LBT failure information to the network side device. Content of the LBT failure information includes an identifier of a BWP on which LBT fails (for example, a BWP number 1).

Figure 4:
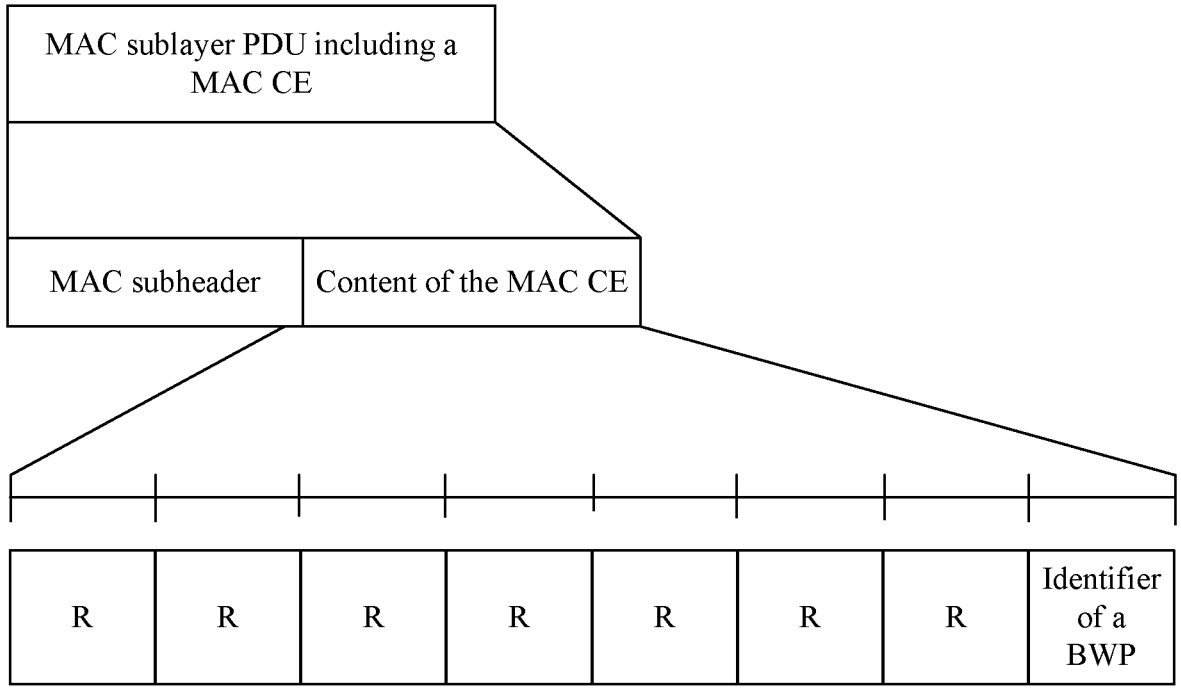
FIG. 4 is a second schematic structural diagram of a MAC CE according to an embodiment of the present disclosure.

As shown in FIG. 4, the MAC CE may include a MAC sub-header and content of the MAC, and the LBT failure information is carried in the content of the MAC CE.

The BWP indicated by the identifier of the BWP may be either a BWP on which LBT fails for the first time or a BWP on which LBT fails recently.

For the BWP on which LBT fails for the first time, for example, the LBT failure occurs on the terminal on the BWP-1, and then changes the BWP-1 to BWP-2. Then, the terminal initiates a random access process on the BWP-2. However, the LBT failure still occurs on the terminal on the BWP-2, and the terminal changes the BWP-2 to BWP-3. Because the BWP-1 is a BWP on which uplink LBT fails for the first time, the LBT failure information reported by the terminal on the BWP-3 is the BWP-1.

For the BWP on which LBT fails recently, for example, the LBT failure occurs on the terminal on the BWP-1, and then changes the BWP-1 to BWP-2. Then, the terminal initiates a random access process on the BWP-2. However, the LBT failure still occurs on the terminal on the BWP-2, and the terminal changes the BWP-2 to BWP-3. Because the BWP-2 is a BWP on which LBT fails recently, the LBT failure information reported by the terminal on the BWP-3 is the BWP-2.

In addition, a multiplexing priority of the LBT failure information is at least higher than the multiplexing priority of the data from the logical channel other than the UL-CCCH.

Furthermore, the multiplexing priority of the LBT failure information may be any one of the following:
  same as the multiplexing priority of the C-RNTI MAC CE;
  lower than only the multiplexing priority of the C-RNTI MAC CE; and
  higher than only the multiplexing priority of the data from the logical channel other than the UL-CCCH.

Embodiment 3

The LBT failure occurs on the terminal on BWP-1 of a cell, and the terminal changes the activated BWP-1 to BWP-2, and initiates a random access process. The terminal reports LBT failure information to the network side device. Content of the LBT failure information includes identifiers of one or more BWPs on which LBT fails (for example, a BWP number 1, a BWP number 2, and a BWP number 3).

There may be an extra indication field after the identifier of the BWP, to indicate whether there is an extra identifier of a BWP. The indication field is an E field. When a value of the indication field is "0", it indicates that there is no identifier of a BWP subsequently, or when a value of the indication field is "1", it indicates that there is an identifier of a BWP subsequently.

As shown in FIG. 5, the MAC CE may include a MAC sub-header and content of the MAC CE, and the LBT failure information is carried in the content of the MAC CE. Specifically, the content of the MAC CE includes one octet. The first bit and the second bit of the octet are used to indicate an identifier 1 of a BWP. The fourth bit and the fifth bit are used to indicate an identifier 2 of a BWP. The seventh bit and the eighth bit are used to indicate an identifier 3 of a BWP. The third bit and the sixth bit are E fields. Because each of the bit following the third bit and the bit following the sixth bit indicates that there is the identifier of the BWP, values of E fields of the third bit and the sixth bit are 1.

In addition, a sequence of arranging the identifiers of the BWPs may be a chronological sequence of LBT failures. For example, an identifier of a BWP on which LBT fails for the first time is arranged in the first place, and correspondingly, an identifier of a BWP on which LBT fails for the last time is arranged in the last place. For another example, an identifier of a BWP on which LBT fails for the last time is arranged in the first place, and an identifier of a BWP on which LBT fails for the first time is arranged in the last place.

In addition, when an indication field set after the identifier of the BWP indicates that there is no identifier of a BWP subsequently, a remaining bit in the content of the MAC CE may be reserved, and may be referred to as a reserved bit.

In addition, a multiplexing priority of the LBT failure information is at least higher than the multiplexing priority of the data from the logical channel other than the UL-CCCH.

Furthermore, the multiplexing priority of the LBT failure information may be any one of the following:
  same as the multiplexing priority of the C-RNTI MAC CE;
  lower than only the multiplexing priority of the C-RNTI MAC CE; and
  higher than only the multiplexing priority of the data from the logical channel other than the UL-CCCH.

It should be noted that for the MAC CE in FIG. 3 to FIG. 5, R represents that a corresponding bit is a reserved bit. In addition, a quantity of bits occupied by the LCD in FIG. 3 and quantities of bits occupied by the identifiers of the BWPs in FIG. 4 and FIG. 5 are examples. A quantity of occupied bits is not limited in this embodiment of the present disclosure.

This embodiment of the present disclosure may include:
  a MAC CE in a first format, including only a MAC sub-header; and a MAC CE in a second format, including a MAC sub-header and content of the MAC CE, where the content of the MAC CE includes indication information of a BWP on which a failure occurs.

According to this embodiment of the present disclosure, when the UE triggers BWP changing due to an uplink LBT failure, the UE may report uplink LBT failure information to the network side by using a MAC CE in a particular format, to achieve balance between a signaling overhead of reporting signaling and a reporting information amount. In addition, transmission is performed by using a MAC CE with a higher priority, to reduce a transmission delay of the MAC CE.

FIG. 6 is a second flowchart of an LBT failure processing method according to an embodiment of the present disclosure. The LBT failure processing method in this embodiment may be applied to a network side device.

As shown in FIG. 6, the LBT failure processing method may include the following step.

Step 601. Receive LBT failure information that is sent by using a MAC CE.

In some embodiments, the LBT failure information includes either one of the following:
  a logical channel identifier, where the logical channel identifier is used to indicate that an LBT failure occurs on a terminal on a BWP; and
  identifiers of N BWPs, where the LBT failure occurs on the terminal on M BWPs, the M BWPs include the N BWPs, N is a positive integer, and M is a positive integer greater than or equal to N.

In some embodiments, when N is 1, the N BWPs are either one of the following:
  a first BWP, where a time at which the LBT failure occurs on the terminal on the first BWP is earlier than a time at which the LBT failure occurs on the terminal on the other BWP in the M BWPs; and
  a second BWP, where a time at which the LBT failure occurs on the terminal on the second BWP is later than a time at which the LBT failure occurs on the terminal on the other BWP in the M BWPs.

In some embodiments, when N is greater than 1, a sequence of arranging the identifiers of the N BWPs is determined based on a chronological sequence of failing, by the terminal, to perform LBT on the N BWPs.

In some embodiments, when the LBT failure information includes the logical channel identifier, the MAC CE includes a MAC sub-header, where the LBT failure information is carried in the MAC sub-header.

In some embodiments, when the LBT failure information includes the identifiers of the N BWPs, the MAC CE includes a MAC sub-header and content of the MAC CE, where
  the identifiers of the N BWPs are carried in the content of the MAC CE.

In some embodiments, the content of the MAC CE further includes an indication field, and the indication field is used to indicate whether a first bit carries an identifier of a BWP, where
  the first bit is a bit following a second bit in the content of the MAC CE, and the second bit is a bit occupied by the indication field.

In some embodiments, when the MAC PDU is generated, a multiplexing priority of the LBT failure information meets any one of the following:
  the multiplexing priority of the LBT failure information is at least higher than a multiplexing priority of data from a first logical channel;
  the multiplexing priority of the LBT failure information is the same as a multiplexing priority of a C-RNTI MAC CE;
  the multiplexing priority of the LBT failure information is lower than only the multiplexing priority of the C-RNTI MAC CE; and
  the multiplexing priority of the LBT failure information is higher than only the multiplexing priority of the data from the first logical channel, where
  the first logical channel is a logical channel other than an uplink common control channel.

It should be noted that this embodiment is used as an implementation of the network side device corresponding to the embodiment shown in FIG. 2. For a specific implementation of this embodiment, refer to the related descriptions of the embodiment shown in FIG. 2. To avoid repeated descriptions, a same beneficial effect can also be achieved. To avoid repeated descriptions, details are not described herein again.

FIG. 7 is a first structural diagram of a terminal according to an embodiment of the present disclosure. As shown in FIG. 7, the terminal 700 includes:
  a sending module 701, configured to send LBT failure information by using a MAC CE in a case of an LBT failure.

In some embodiments, the LBT failure information includes either one of the following:
  a logical channel identifier, where the logical channel identifier is used to indicate that the LBT failure occurs on the terminal on a BWP; and
  identifiers of N BWPs, where the LBT failure occurs on the terminal on M BWPs, the M BWPs include the N BWPs, N is a positive integer, and M is a positive integer greater than or equal to N.

In some embodiments, when N is 1, the N BWPs are either one of the following:
  a first BWP, where a time at which the LBT failure occurs on the terminal on the first BWP is earlier than a time at which the LBT failure occurs on the terminal on the other BWP in the M BWPs; and
  a second BWP, where a time at which the LBT failure occurs on the terminal on the second BWP is later than a time at which the LBT failure occurs on the terminal on the other BWP in the M BWPs.

In some embodiments, when N is greater than 1, a sequence of arranging the identifiers of the N BWPs is determined based on a chronological sequence of failing, by the terminal, to perform LBT on the N BWPs.

In some embodiments, when the LBT failure information includes the logical channel identifier, the MAC CE includes a MAC sub-header, where
  the LBT failure information is carried in the MAC sub-header.

In some embodiments, when the LBT failure information includes the identifiers of the N BWPs, the MAC CE includes a MAC sub-header and content of the MAC CE, where
  the identifiers of the N BWPs are carried in the content of the MAC CE.

In some embodiments, the content of the MAC CE further includes an indication field, and the indication field is used to indicate whether a first bit carries an identifier of a BWP, where
  the first bit is a bit following a second bit in the content of the MAC CE, and the second bit is a bit occupied by the indication field.

In some embodiments, when the MAC PDU is generated, a multiplexing priority of the LBT failure information meets any one of the following:
- the multiplexing priority of the LBT failure information is at least higher than a multiplexing priority of data from a first logical channel;
- the multiplexing priority of the LBT failure information is the same as a multiplexing priority of a C-RNTI MAC CE;
- the multiplexing priority of the LBT failure information is lower than only the multiplexing priority of the C-RNTI MAC CE; and
- the multiplexing priority of the LBT failure information is higher than only the multiplexing priority of the data from the first logical channel, where
- the first logical channel is a logical channel other than an uplink common control channel.

The terminal 700 can implement various processes implemented by the terminal in the foregoing method embodiment of the present disclosure, and achieve the same beneficial effects. To avoid repetition, details are not described herein again.

FIG. 8 is a first structural diagram of a network side device according to an embodiment of the present disclosure. As shown in FIG. 8, the network side device 800 includes:
- a receiving module 801, configured to receive LBT failure information that is sent by using a MAC CE.

In some embodiments, the LBT failure information includes either one of the following:
- a logical channel identifier, where the logical channel identifier is used to indicate that an LBT failure occurs on a terminal on a BWP; and
- identifiers of N BWPs, where the LBT failure occurs on the terminal on M BWPs, the M BWPs include the N BWPs, N is a positive integer, and M is a positive integer greater than or equal to N.

In some embodiments, when N is 1, the N BWPs are either one of the following:
- a first BWP, where a time at which the LBT failure occurs on the terminal on the first BWP is earlier than a time at which the LBT failure occurs on the terminal on the other BWP in the M BWPs; and
- a second BWP, where a time at which the LBT failure occurs on the terminal on the second BWP is later than a time at which the LBT failure occurs on the terminal on the other BWP in the M BWPs.

In some embodiments, when N is greater than 1, a sequence of arranging the identifiers of the N BWPs is determined based on a chronological sequence of failing, by the terminal, to perform LBT on the N BWPs.

In some embodiments, when the LBT failure information includes the logical channel identifier, the MAC CE includes a MAC sub-header, where
- the LBT failure information is carried in the MAC sub-header.

In some embodiments, when the LBT failure information includes the identifiers of the N BWPs, the MAC CE includes a MAC sub-header and content of the MAC CE, where
- the identifiers of the N BWPs are carried in the content of the MAC CE.

In some embodiments, the content of the MAC CE further includes an indication field, and the indication field is used to indicate whether a first bit carries an identifier of a BWP, where
- the first bit is a bit following a second bit in the content of the MAC CE, and the second bit is a bit occupied by the indication field.

In some embodiments, when the MAC PDU is generated, a multiplexing priority of the LBT failure information meets any one of the following:
- the multiplexing priority of the LBT failure information is at least higher than a multiplexing priority of data from a first logical channel;
- the multiplexing priority of the LBT failure information is the same as a multiplexing priority of a C-RNTI MAC CE;
- the multiplexing priority of the LBT failure information is lower than only the multiplexing priority of the C-RNTI MAC CE; and
- the multiplexing priority of the LBT failure information is higher than only the multiplexing priority of the data from the first logical channel, where
- the first logical channel is a logical channel other than an uplink common control channel.

The network side device 800 can implement various processes that can be implemented by the network side device in the foregoing method embodiment of the present disclosure, and achieve same beneficial effects. To avoid repetition, details are not described herein again.

Figure 9:
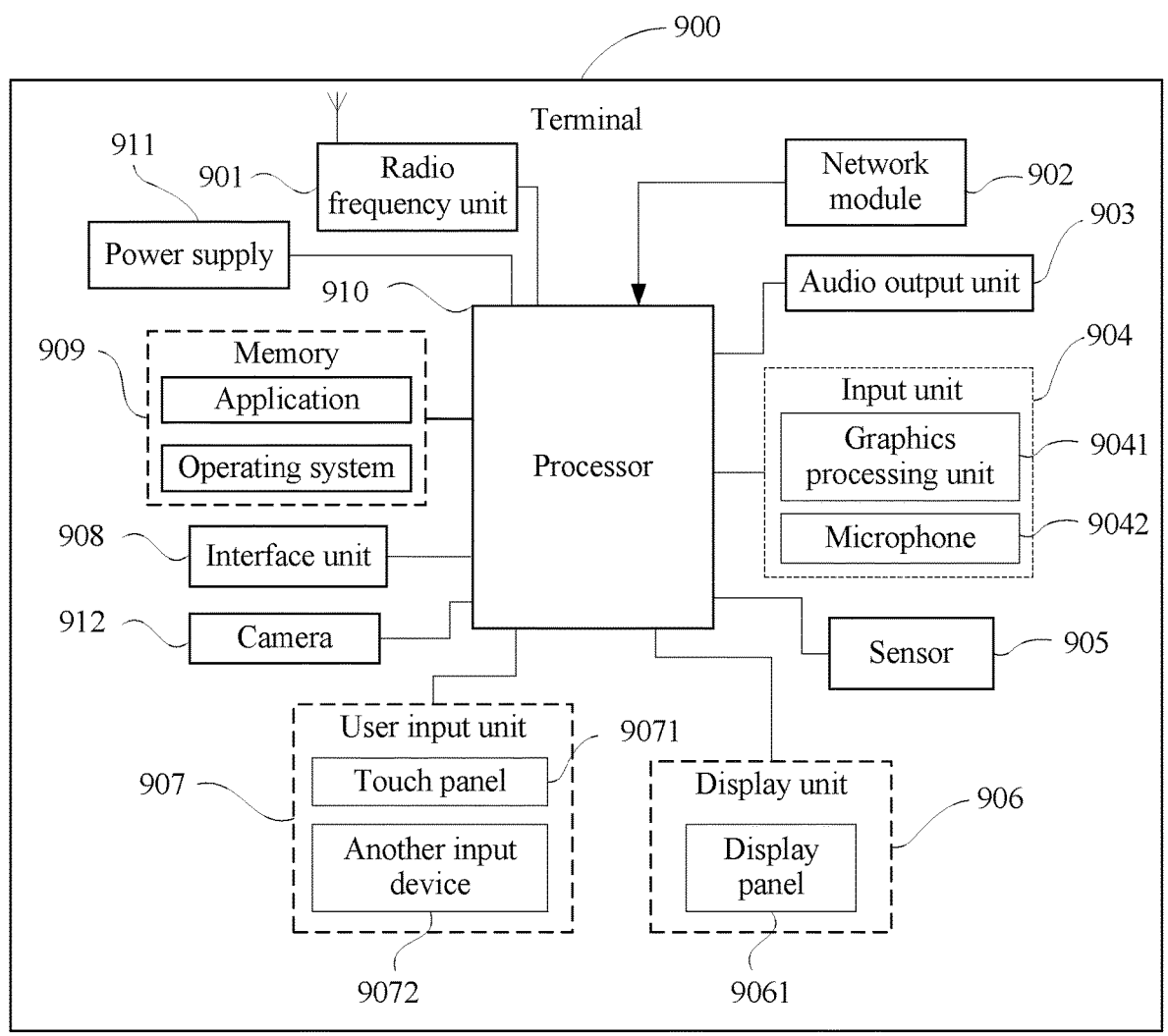
FIG. 9 is a second structural diagram of a terminal according to an embodiment of the present disclosure.

FIG. 9 is a second structural diagram of a terminal according to an embodiment of the present disclosure. The terminal may be a terminal for implementing the embodiments of the present disclosure. As shown in FIG. 9, the terminal 900 includes but is not limited to: a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 9 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a laptop computer, a palmtop computer, an in-vehicle terminal, a wearable device, and a pedometer.

The radio frequency unit 901 is configured to send LBT failure information by using a MAC CE in the case of an LBT failure.

It should be noted that the terminal 900 in this embodiment can implement each process in the foregoing method embodiments in the embodiments of the present disclosure, and achieve same beneficial effects. To avoid repetition, details are not described herein again.

It should be understood that in this embodiment of the present disclosure, the radio frequency unit 901 may be configured to receive and send information or receive, and send a signal in a call process. Specifically, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, and a duplexer. In addition, the radio frequency unit 901 may also communicate with a network and another device by using a wireless communications system.

The terminal provides wireless broadband Internet access for a user by using the network module 902, for example, helping the user send and receive an email, browse a web page, and access streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received voice, or a message received voice) related to a specific function executed by the terminal 900. The audio output unit 903 includes a loudspeaker, a buzzer, a receiver, and the like.

The input unit 904 is configured to receive audio or video signals. The input unit 904 may include a Graphics Processing Unit (GPU) 9041 and a microphone 9042. The graphics processing unit 9041 processes image data of a static picture or a video obtained by an image capture apparatus (for example, a camera) in video capture mode or image capture mode. A processed image frame may be displayed on the display unit 906. The image frame processed by the graphics processing unit 9041 may be stored in the memory 909 (or another storage medium) or sent by using the radio frequency unit 901 or the network module 902. The microphone 9042 may receive sound and can process such sound into audio data. The processed audio data may be converted, in a telephone call mode, into a format that may be sent to a mobile communication base station by using the radio frequency unit 901, and the audio data obtained after conversion is output.

The terminal 900 further includes at least one sensor 905, such as an optical sensor, a motion sensor, or another sensor. Specifically, the optical sensor includes an ambient light sensor and a proximity sensor. The ambient light sensor may adjust luminance of the display panel 9061 based on brightness of ambient light. The proximity sensor may turn off the display panel 9061 and/or backlight when the terminal 900 is moved to an ear. As a type of the motion sensor, an accelerometer sensor may detect magnitude of acceleration in each direction (generally, on three axes), and may detect magnitude and a direction of gravity when being static. The accelerometer sensor may be used for recognizing a terminal gesture (for example, portrait and landscape orientation switching, a related game, or magnetometer posture calibration), a function related to vibration recognition (for example, a pedometer or a strike), or the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by the user or information provided for the user. The display unit 906 may include a display panel 9061. The display panel 9061 may be configured in a form of a Liquid Crystal Display (LCD), an Organic Light-Emitting Diode (OLED), or the like.

The user input unit 907 may be configured to receive input digit or character information and generate key signal input related to user settings and function control of the terminal. Specifically, the user input unit 907 includes a touch panel 9071 and another input device 9072. The touch panel 9071, also called a touchscreen, may collect a touch operation of a user on or near the touch panel (for example, the operation of the user on the touch panel 9071 or near the touch panel 9071 by using any suitable accessory such as a finger or a stylus). The touch panel 9071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 910, and can receive and execute a command sent by the processor 910. In addition, the touch panel 9071 may be implemented by using various types such as a resistive type, a capacitive type, an infrared ray type or a surface acoustic wave type. In addition to the touch panel 9071, the user input unit 907 may further include another input device 9072. Specifically, the another input device 9072 may include but is not limited to: a physical keyboard, a function key (such as a volume control key, or a switch key), a trackball, a mouse, and a joystick. Details are not described herein.

Further, the touch panel 9071 may cover the display panel 9061. After detecting the touch operation on or near the touch panel 9071, the touch panel 9071 transmits the touch operation to the processor 910 to determine a type of a touch event, and then the processor 910 provides corresponding visual output on the display panel 9061 based on the type of the touch event. Although in FIG. 9, the touch panel 9071 and the display panel 9061 are used as two independent components to implement input and output functions of the terminal, in some embodiments, the touch panel 9071 and the display panel 9061 may be integrated to implement the input and output functions of the terminal. This is not specifically limited herein.

The interface unit 908 is an interface connecting an external apparatus to the terminal 900. For example, the external apparatus may include a wired or wireless headphone jack, an external power supply (or a battery charger) port, a wired or wireless data port, a storage card port, a port for connecting an apparatus having an identification module, an audio Input/Output (I/O) port, a video I/O port, a headset jack, or the like. The interface unit 908 may be configured to receive input (for example, data information and power) from the external apparatus and transmit the received input to one or more elements in the terminal 900, or may be configured to transmit data between the terminal 900 and the external apparatus.

The memory 909 may be configured to store a software program and various data. The memory 909 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 909 may include a high-speed random access memory or a nonvolatile memory, for example, at least one disk storage device, a flash memory, or another volatile solid-state storage device.

The processor 910 is a control center of the terminal, connects all parts of the entire terminal by using various interfaces and lines, and performs various functions of the terminal and data processing by running or executing a software program and/or a module stored in the memory 909 and invoking data stored in the memory 909, to perform overall monitoring on the terminal. The processor 910 may include one or more processing units. Preferably, the processor 910 may be integrated with an application processor and a modem processor. The application processor mainly processes an operating system, a user interface, an application, and the like. The modem processor mainly processes wireless communication. It may be understood that the modem processor may not be integrated into the processor 910.

The terminal 900 may further include the power supply 911 (such as a battery) that supplies power to each component. Preferably, the power supply 911 may be logically connected to the processor 910 by using a power management system, so as to implement functions such as charging, discharging, and power consumption management by using the power management system.

In addition, the terminal 900 includes some function modules not shown. Details are not described herein.

Preferably, an embodiment of the present disclosure further provides a terminal, including a processor 910, a memory 909, and a computer program that is stored in the memory 909 and that can be run on the processor 910. When the computer program is executed by the processor 910, processes of the foregoing LBT failure processing method embodiment are implemented, and a same technical effect can be achieved. To avoid repetition, details are not described herein again.

Figure 10:
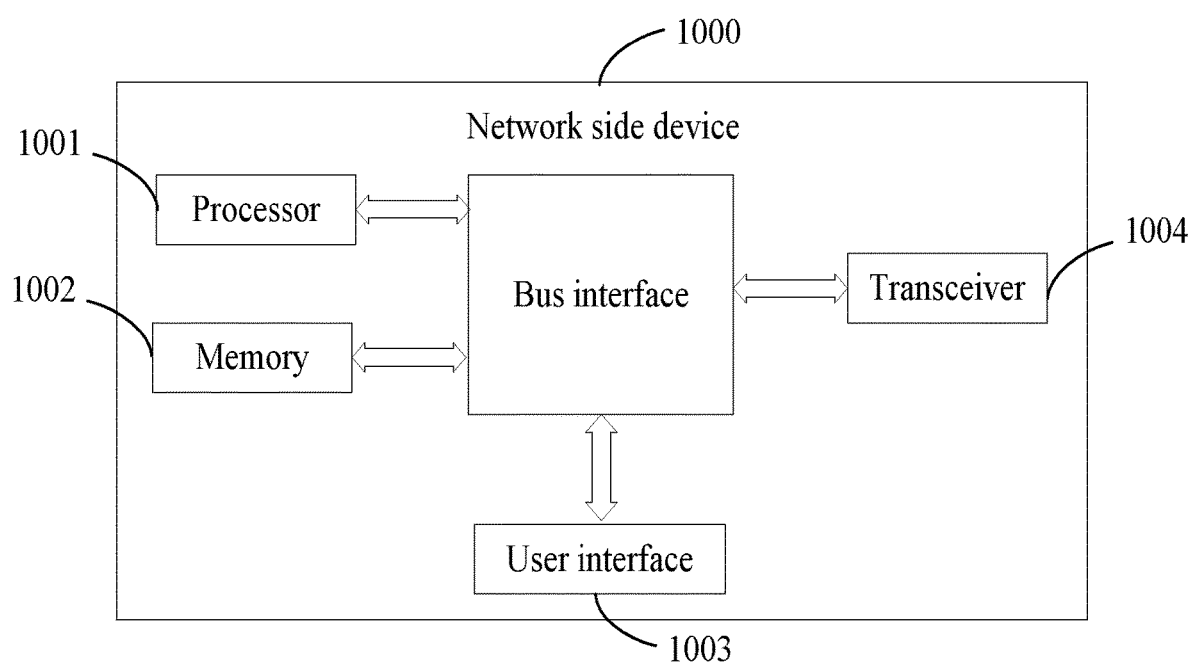
FIG. 10 is a second structural diagram of a network side device according to an embodiment of the present disclosure.

FIG. 10 is a second structural diagram a of a network side device according to an embodiment of the present disclosure. As shown in FIG. 10, the network side device 1000 includes a processor 1001, a memory 1002, a user interface 1003, a transceiver 1004, and a bus interface.

In this embodiment of the present disclosure, the network side device 1000 further includes: a computer program that is stored in the memory 1002 and that can be executed on the processor 1001. When the computer program is executed by the processor 1001, the following step is implemented:

receiving LBT failure information that is sent by using a MAC CE.

In FIG. 10, a bus architecture may include any quantity of interconnected buses and bridges, which are specifically connected together by various circuits of one or more processors represented by the processor 1001 and a memory represented by the memory 1002. The bus architecture may further link various other circuits such as a peripheral device, a voltage regulator, and a power management circuit. These are well known in the art, and therefore are not further described in this specification. The bus interface provides an interface. The transceiver 1004 may be a plurality of elements, in other words, include a transmitter and a receiver, and provide a unit for communicating with various other devices on a transmission medium. For different user equipment, a user interface 1003 may also be an interface capable of connecting externally and internally to a required device. The connected device includes but is not limited to a keypad, a display, a loudspeaker, a microphone, and a joystick.

The processor 1001 is responsible for managing the bus architecture and common processing, and the memory 1002 may store data used when the processor 1001 performs an operation.

In some embodiments, the LBT failure information includes either one of the following:

a logical channel identifier, where the logical channel identifier is used to indicate that an LBT failure occurs on a terminal on a BWP; and identifiers of N BWPs, where the LBT failure occurs on the terminal on M BWPs, the M BWPs include the N BWPs, N is a positive integer, and M is a positive integer greater than or equal to N.

In some embodiments, when N is 1, the N BWPs are either one of the following:

a first BWP, where a time at which the LBT failure occurs on the terminal on the first BWP is earlier than a time at which the LBT failure occurs on the terminal on the other BWP in the M BWPs; and a second BWP, where a time at which the LBT failure occurs on the terminal on the second BWP is later than a time at which the LBT failure occurs on the terminal on the other BWP in the M BWPs.

In some embodiments, when N is greater than 1, a sequence of arranging the identifiers of the N BWPs is determined based on a chronological sequence of failing, by the terminal, to perform LBT on the N BWPs.

In some embodiments, when the LBT failure information includes the logical channel identifier, the MAC CE includes a MAC sub-header, where the LBT failure information is carried in the MAC sub-header.

In some embodiments, when the LBT failure information includes the identifiers of the N BWPs, the MAC CE includes a MAC sub-header and content of the MAC CE, where the identifiers of the N BWPs are carried in the content of the MAC CE.

In some embodiments, the content of the MAC CE further includes an indication field, and the indication field is used to indicate whether a first bit carries an identifier of a BWP, where the first bit is a bit following a second bit in the content of the MAC CE, and the second bit is a bit occupied by the indication field.

In some embodiments, when the MAC PDU is generated, a multiplexing priority of the LBT failure information meets any one of the following:

the multiplexing priority of the LBT failure information is at least higher than a multiplexing priority of data from a first logical channel;

the multiplexing priority of the LBT failure information is the same as a multiplexing priority of a C-RNTI MAC CE;

the multiplexing priority of the LBT failure information is lower than only the multiplexing priority of the C-RNTI MAC CE; and the multiplexing priority of the LBT failure information is higher than only the multiplexing priority of the data from the first logical channel, where the first logical channel is a logical channel other than an uplink common control channel.

The network side device 1000 can implement each process implemented by the network side device in the foregoing method embodiments. To avoid repetition, details are not described herein again.

An embodiment of the present disclosure further provides a computer readable storage medium, where the computer readable storage medium stores a computer program. When the computer program is executed by a processor, the processes of the embodiment of the LBT failure processing method on the terminal side are implemented, or when the computer program is executed by a processor, the processes of the embodiment of the LBT failure processing method on the network side device side are implemented, and a same technical effect can be achieved. To avoid repetition, details are not described herein again. The computer-readable storage medium includes a Read-Only Memory (ROM), a Random Access Memory (RAM), a magnetic disk, an optical disc, or the like.

It should be noted that in this specification, the terms "include", "contain" and any other variants thereof are intended to cover non-exclusive inclusion, so that a process, a method, an article, or a device that includes a series of elements not only includes these elements, but may also include other elements not expressly listed, or also include elements inherent to this process, method, article, or device. An element limited by "includes a . . . " does not, without more constraints, exclude the presence of additional identical elements in the process, method, article, or device that includes the element.

Based on the foregoing descriptions of the embodiments, a person skilled in the art may clearly understand that the method in the foregoing embodiment may be implemented by software plus a necessary universal hardware platform or by hardware only. In most circumstances, the former is a preferred implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network side device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. A Listen-Before-Talk (LBT) failure processing method, performed by a terminal, the method comprising:
sending LBT failure information by using a Medium Access Control (MAC) Control Element (CE) in a case of an LBT failure,
wherein when a MAC Protocol Data Unit (PDU) is generated, a multiplexing priority of the LBT failure information is at least higher than a multiplexing priority of data from a first logical channel, wherein
the first logical channel is a logical channel other than an uplink common control channel.

2. The method according to claim 1, wherein the LBT failure information comprises either one of the following:
a logical channel identifier, wherein the logical channel identifier is used to indicate that the LBT failure occurs on the terminal on an activated BWP; and
identifiers of N BWPs, wherein the LBT failure occurs on the terminal on M BWPs, the M BWPs comprise the N BWPs, N is a positive integer, and M is a positive integer greater than or equal to N.

3. The method according to claim 2, wherein when N is 1, the N BWPs are either one of the following:
a first BWP, wherein a time at which the LBT failure occurs on the terminal on the first BWP is earlier than a time at which the LBT failure occurs on the terminal on the other BWP in the M BWPs; and
a second BWP, wherein a time at which the LBT failure occurs on the terminal on the second BWP is later than a time at which the LBT failure occurs on the terminal on the other BWP in the M BWPs.

4. The method according to claim 2, wherein when N is greater than 1, a sequence of arranging the identifiers of the N BWPs is determined based on a chronological sequence of failing, by the terminal, to perform LBT on the N BWPs.

5. The method according to claim 2, wherein when the LBT failure information comprises the logical channel identifier, the MAC CE comprises a MAC sub-header, wherein the LBT failure information is carried in the MAC sub-header.

6. The method according to claim 2, wherein when the LBT failure information comprises the identifiers of the N BWPs, the MAC CE comprises a MAC sub-header and content of the MAC CE, wherein
the identifiers of the N BWPs are carried in the content of the MAC CE.

7. The method according to claim 6, wherein the content of the MAC CE further comprises an indication field, and the indication field is used to indicate whether a first bit carries an identifier of a BWP, wherein
the first bit is a bit following a second bit in the content of the MAC CE, and the second bit is a bit occupied by the indication field.

8. The method according to claim 1, wherein when the MAC Protocol Data Unit (PDU) is generated, the multiplexing priority of the LBT failure information meets any one of the following:
the multiplexing priority of the LBT failure information is the same as a multiplexing priority of a Cell Radio Network Temporary Identifier (C-RNTD) MAC CE;
the multiplexing priority of the LBT failure information is lower than only the multiplexing priority of the C-RNTI MAC CE; or
the multiplexing priority of the LBT failure information is higher than only the multiplexing priority of the data from the first logical channel.

9. The method according to claim 1, wherein the sending LBT failure information by using a MAC CE comprises:
changing an activated BWP to another BWP, triggering a random access process, and sending the MAC CE by using the another BWP, wherein the MAC CE comprises the LBT failure information.

10. A Listen-Before-Talk (LBT) failure processing method, performed by a network side device, the method comprising:
receiving LBT failure information that is sent by using a Medium Access Control (MAC) Control Element (CE), wherein when a MAC Protocol Data Unit (PDU) is generated, a multiplexing priority of the LBT failure information is at least higher than a multiplexing priority of data from a first logical channel, wherein
the first logical channel is a logical channel other than an uplink common control channel.

11. The method according to claim 10, wherein the LBT failure information comprises either one of the following:
a logical channel identifier, wherein the logical channel identifier is used to indicate that an LBT failure occurs on a terminal on an activated BWP; and
identifiers of N BWPs, wherein the LBT failure occurs on the terminal on M BWPs, the M BWPs comprise the N BWPs, N is a positive integer, and M is a positive integer greater than or equal to N.

12. The method according to claim 11, wherein when Nis 1, the N BWPs are either one of the following:
a first BWP, wherein a time at which the LBT failure occurs on the terminal on the first BWP is earlier than a time at which the LBT failure occurs on the terminal on the other BWP in the M BWPs; and
a second BWP, wherein a time at which the LBT failure occurs on the terminal on the second BWP is later than a time at which the LBT failure occurs on the terminal on the other BWP in the M BWPs.

13. The method according to claim 11, wherein when N is greater than 1, a sequence of arranging the identifiers of the N BWPs is determined based on a chronological sequence of failing, by the terminal, to perform LBT on the N BWPs.

14. The method according to claim 11, wherein when the LBT failure information comprises the logical channel identifier, the MAC CE comprises a MAC sub-header, wherein
the LBT failure information is carried in the MAC sub-header.

15. The method according to claim 11, wherein when the LBT failure information comprises the identifiers of the N BWPs, the MAC CE comprises a MAC sub-header and content of the MAC CE, wherein
the identifiers of the N BWPs are carried in the content of the MAC CE.

16. The method according to claim 15, wherein the content of the MAC CE further comprises an indication field, and the indication field is used to indicate whether a first bit carries an identifier of a BWP, wherein
the first bit is a bit following a second bit in the content of the MAC CE, and the second bit is a bit occupied by the indication field.

17. The method according to claim 10, wherein when the MAC Protocol Data Unit (PDU) is generated, the multiplexing priority of the LBT failure information meets any one of the following:
the multiplexing priority of the LBT failure information is the same as a multiplexing priority of a Cell Radio Network Temporary Identifier (C-RNTI) MAC CE;
the multiplexing priority of the LBT failure information is lower than only the multiplexing priority of the C-RNTI MAC CE; or
the multiplexing priority of the LBT failure information is higher than only the multiplexing priority of the data from the first logical channel.

18. A terminal, comprising a processor, a memory, and a computer program stored in the memory and capable of running on the processor, wherein the computer program, when executed by the processor, causes the processor to perform a Listen-Before-Talk (LBT) failure processing method, wherein the method comprises:
sending LBT failure information by using a Medium Access Control (MAC) Control Element (CE) in a case of an LBT failure,
wherein when a MAC Protocol Data Unit (PDU) is generated, a multiplexing priority of the LBT failure information is at least higher than a multiplexing priority of data from a first logical channel, wherein
the first logical channel is a logical channel other than an uplink common control channel.

19. The terminal according to claim 18, wherein the LBT failure information comprises either one of the following:
a logical channel identifier, wherein the logical channel identifier is used to indicate that the LBT failure occurs on the terminal on an activated BWP; and
identifiers of N BWPs, wherein the LBT failure occurs on the terminal on M BWPs, the M BWPs comprise the N BWPs, N is a positive integer, and M is a positive integer greater than or equal to N.

20. The terminal according to claim 19, wherein when N is 1, the N BWPs are either one of the following:
a first BWP, wherein a time at which the LBT failure occurs on the terminal on the first BWP is earlier than a time at which the LBT failure occurs on the terminal on the other BWP in the M BWPs; and
a second BWP, wherein a time at which the LBT failure occurs on the terminal on the second BWP is later than a time at which the LBT failure occurs on the terminal on the other BWP in the M BWPs.

\* \* \* \* \*